Jan. 17, 1967    E. ARNHOLDT    3,298,636
AIRFOIL
Filed Jan. 15, 1965

INVENTOR,
ERIC ARNHOLDT

BY Watson, Cole, Grindle & Watson
ATTORNEYS

3,298,636
AIRFOIL
Eric Arnholdt, 6010 Seacliff Road, McLean, Va. 22101
Filed Jan. 15, 1965, Ser. No. 425,853
1 Claim. (Cl. 244—41)

This invention relates to improvements in airfoils, and has for its primary objects to provide an airfoil having an increased lift-to-drag ratio and thus an increased lifting or sustaining efficiency; to provide such an airfoil in which the span thereof may be substantially decreased in proportion to its chord, to secure more even distribution of the low pressure area over the airfoil, thus creating a more even distribution of the lifting or pulling force over the entire airfoil; and to provide such an airfoil which permits the use of a higher angle of attack and/or a lower relative velocity with respect to fluid through which the airfoil moves, without stalling or undue loss of efficiency.

It is known that the lift or pull over an airfoil section results from the low pressure area created by the acceleration of air or other fluid over its upper or suction surface. The amount of acceleration of the fluid and therefore the magnitude of the total pressure differential between the upper and lower surfaces of the airfoil is a function of the distance traveled by the fluid from the leading edge to the trailing edge as it flows over the oppositely directed surfaces of the airfoil.

Normally, in designing a high-lift airfoil, a greater acceleration of fluid over the top or suction surface is achieved by increasing the thickness or camber of the airfoil section. This, however, produces an increased drag by presenting a larger frontal or leading edge surface which, at higher velocities, results in a less efficient airfoil due to the less satisfactory lift-to-drag ratio which results.

The conventional airfoil section shape increases in thickness or camber from the leading edge to a point approximately 20% to 50% of the chord of the airfoil and then decreases in thickness or camber rather uniformly to the trailing edge. Thus, the greatest acceleration of fluid flow and the area of lowest pressure and greatest lift or pull is located at approximately 30% of the chord. The other areas on the upper or suction surface of the airfoil have a relatively slower fluid flow thereover, and therefore enjoy a decreased pressure differential with respect to the lower or pressure surface of the airfol. Therefore, in order to achieve a reasonably efficient airfoil having an acceptable lift-to-drag ratio, a relatively large span vs. chord ratio, or in other words, aspect ratio, is required.

Thus the conventional airfoil is shaped to cause the fluid flow to separate near its leading edge and to flow in a chord-wise direction from its leading to its trailing edge over the suction and pressure surfaces respectively thereof, and then to merge after passing the trailing edge. In doing this, the shape of the airfoil has been such as to require the flow over the suction surface to describe a single curve or arc representing its deflection from a line or plane representing the relatively undeflected flowpath pursued by the fluid in flowing across the lower or pressure surface of the airfoil.

With the foregoing considerations in mind, the present invention is based on the concept of increasing the total distance which the fluid must travel in passing over the upper or suction surface of the airfoil, without materially changing the length of the path traveled by the fluid in passing over its lower or pressure surface to achieve thereby a higher lift-to-drag ratio and therefore a more efficient airfoil section.

Further, it is a concept of the present invention to sustain a relatively high velocity fluid flow over the upper or suction surface for a greater portion of the chord of the airfoil than has heretofore been possible, for the purpose of achieving a more efficient airfoil having a lower aspect ratio. The advantages of this are obvious in instances where a short wing span or propeller or rotor diameter may be desired.

In accordance with the present invention, the path of flow of fluid over the upper or suction surface of the airfoil is materially increased by forming the suction surface of the airfoil is an undulating one in which the undulations extend spanwise of the airfoil, and by causing the fluid to pursue a path substantially conforming to these undulations in flowing across the suction surface of the airfoil. The means for achieving this latter function in accordance with the invention may assume varying forms so long as it is adapted to deliver air at high velocities into and across the valleys between undulations, and generally tangentially to the curvature of the bottoms of these valleys, the velocity of the fluid thus introduced being sufficiently greater than that of the fluid flow across the undulations from the leading edge to create a reduced pressure in the valley or valleys such as will deflect the mainstream of fluid into them and cause it to follow the curvature of the bottoms of the valleys as well as of the crests of the undulations.

In one exemplification of the invention, this is achieved by transmitting fluid through a passage within the airfoil from the pressure surface thereof to the lower or bottom portion of the valley or valleys, and causing said fluid to be discharged into the valley or valleys in the form of constricted jet streams.

The foregoing and other features and advantages of the invention will be made more readily apparent by reference to the accompanying drawings, in which.

Figure 1:
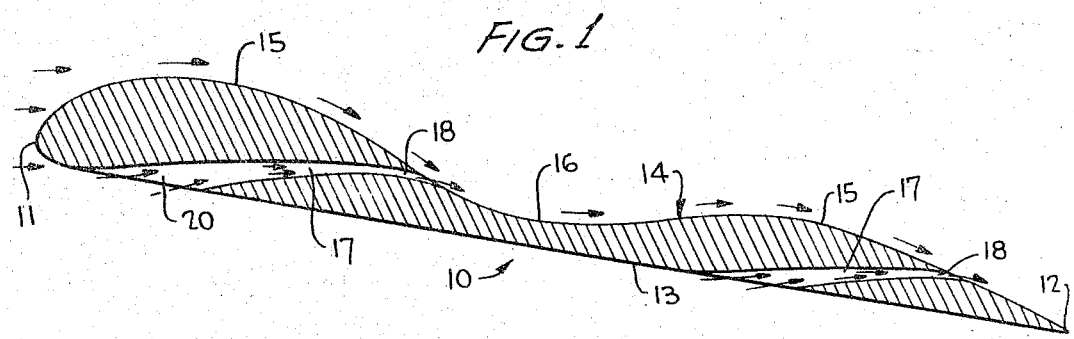
FIGURE 1 is a cross-section through an airfoil in accordance with one specific exemplification of the invention.
Figure 2:
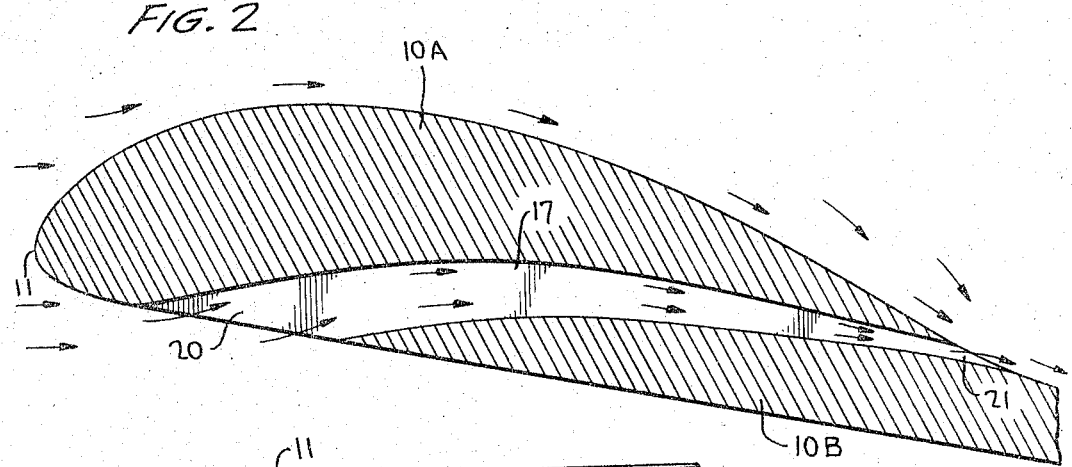
FIGURE 2 is a substantially enlarged section through a portion of the airfoil structure shown in FIGURE 1.
Figure 3:
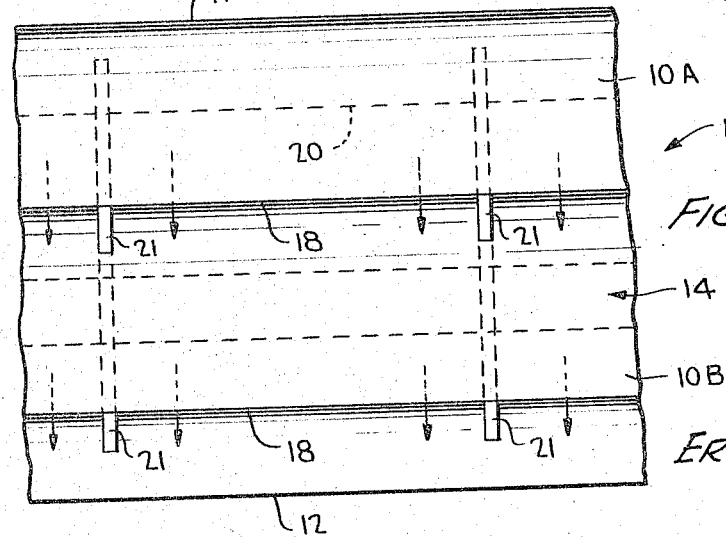
FIGURE 3 is a fragmentary plan view of the structure shown in FIGURE 2.

Referring now in detail to the accompanying drawings, and first considering the structure illustrated in FIGURES 1 to 3 inclusive, the airfoil which is designated 10 in its entirety has leading and trailing edges 11 and 12 respectively and relatively spaced pressure and suction surfaces 13 and 14 arranged so that as the airfoil moves through or relatively to a fluid, in the direction of its leading edge 11, the fluid will be divided by the leading edge 11 to flow across the opposed surfaces 13 and 14 and merge again after passing beyond the trailing edge 12. As is usual, the pressure surface 13, corresponding to the lower surface of an airplane wing or the rear face or surface of a propeller or the like, is substantially flat or has but a nominal curvature in the direction of the chord of the airfoil. However, the upper surface 14 is formed with a plurality of undulations, the crests of which are designated at 15, these being but two in number in FIGURE 1, though obviously there may be a considerably greater number of undulations and the chordal dimension of the airfoil may be increased to the extent necessary to accommodate them.

The numeral 16 designates the valley between each pair of adjoining crests 15 of the undulations. As will be readily apparent from FIGURES 1 and 2, the crest portions 15 of the undulations are convexly curved, while the valley 16 between them is concavely curved in such manner that the surfaces of the crests and valley areas 15 and 16 merge smoothly with each other.

For causing the fluid or air to follow an undulatory path over the suction surface 14 conforming substantially to the undulatory curvature of said surface as defined by the respective crests 15 and intervening valleys 16 thereof, the airfoil of the present exemplification is formed with a fluid passage 17 communicating with the valley 16 adjacent its bottom through a restricted orifice or nozzle 18 which opens into the valley and is directed substantially tangentially to the curvature thereof in a direction chordally of the airfoil and rearwardly toward the trailing edge 12 thereof.

It will be understood that air or other fluid may be supplied to the orifice 18 from a suitable source which might conceivably comprise a compressor or compressors on an aircraft of which such airfoil is a component. However, in the preferred embodiment this is achieved in novel manner by arranging the passage 17 to extend completely through the airfoil structure and to open through its pressure surface 13.

The passage 17 extends substantially diagonally forwardly or toward the leading edge 11 from its orifice 18 to its mouth 20 which opens through the lower or pressure surface 13 of the airfoil. By virtue of the diagonal inclination of the passage 17, its enlarged mouth 20 may function somewhat in the manner of an air scoop to deliver air or other fluid into the passage 17 incident to the forward velocity of the airfoil relative to the air or other fluid in which it operates. Thus the air or other fluid is caused to enter the mouth 20 in the preferred embodiment, both due to the scooping action of the mouth 20 as well as to the difference in pressure existing on opposite sides of the airfoil.

In order to increase the velocity and lower the pressure of the fluid within the passage 17 as it passes therethrough, the passage 17 is formed to converge toward its restricted end or outlet orifice 18 in the manner which is best illustrated in FIGURE 2.

As is shown in FIGURE 3, the passage 17, together with its mouth 20 and discharge orifice 18, is substantially coextensive in a spanwise direction with the airfoil structure in its entirety, being interrupted or bridged at intervals by suitable structural interconnections 21 which, for instance, in an aircraft wing structure might constitute portions of the internal frame or ribs which function to rigidly interconnect the two portions 10a and 10b (FIGURE 2) of the airfoil structure across the elongated passage 17.

In the operation of the airfoil illustrated in FIGURES 1, 2 and 3, as the airfoil moves through a fluid such as air in the direction of its leading edge 11, there will be produced a relative flow of the divided streams of air or fluid generally in the direction indicated by the arrow in FIGURE 1 across the upper and lower, or suction and pressure surfaces 13 and 14 respectively, this flow being generally in a direction chordally of the airfoil from the leading edge 11 to the trailing edge 12, so that the divided fluid streams merge after their relative movement past the trailing edge 12. Due to the relatively straight or rectilinear conformation of the pressure surface 13 in a chordal direction, the air flow across and in engagement with this surface will normally pursue a path of minimum length in its movement from the leading edge 11 to the trailing edge 12, and thus will not be at any time appreciably accelerated in a manner such as appreciably to reduce its pressure.

However, the relative fluid flow over the suction surface 14 will be through a substantially greater path than that of the air flow over the pressure surface 13, due to the fact that such air or fluid flow over the surface 14 is caused to substantially follow the undulations thereof. Thus as the fluid moves relatively past the leading edge 11, it is deflected upwardly to move over the crest area 15 adjacent the leading edge, following which it is deflected downwardly toward the bottom of the valley 16 by the inducting action of the inflowing high velocity and reduced pressure air stream which enters the valley 16 tangentially to the curvature of its bottom through the restricted orifice 18. In addition to deflecting the main airstream downwardly after the latter has passed over the leading crest 15, the fluid jet issuing through the orifice 18 normally will have attained a higher velocity than the main airstream and will impart added velocity to the latter, thereby further contributing to the reduction of air or fluid pressure over the surface 14. The air or fluid then will pass over the next succeeding crest 15, following which the above-described action may be repeated by the action of a further jet orifice 18' and associated supply passage 17'.

Thus by the use of one or more orifices 18 in the valleys between adjoining undulations or following each undulation 15, the fluid passing over the suction surface 14 of the airfoil may be caused to substantially follow the curvature of the undulations to increase the length of its path of flow and thereby to accelerate its flow to a high velocity which may be maintained over substantially the entire area of the suction surface 14, from the leading edge to the trailing edge thereof. Because of this, the chordal dimension of the airfoil may be substantially unlimited, and if desired a greatly increased chordal dimension of the airfoil may serve to compensate for a corresponding decrease in its span.

In this application, I have shown and described but a minimum number of specific exemplifications of the invention simply by way of illustration of the preferred mode contemplated by me of practicing the invention. However, I recognize that these exemplifications are capable of modification and variation in ways which will be obvious to one skilled in this art, and aware of my inventive concept as herein disclosed. Accordingly, the drawings and description herein are to be construed as merely illustrative in nature, rather than as limitative.

Having thus described my invention, I claim:

An airfoil having conventional leading and trailing edges, the leading edge being defined by a fixed portion of said airfoil, an relatively-spaced suction and pressure surfaces extending between said edges, said pressure surface being substantially flat in a direction chordwise of the airfoil, said suction surface being of undulating conformation comprising relatively-spaced crests extending spanwise of the airfoil, with a valley between said crests, said crests being convexly curved in a chordwise direction and merging smoothly with said valley, said airfoil including means for causing a stream of fluid flowing across said undulations from the leading edge of the airfoil toward the trailing edge of the airfoil to pursue an undulating path conforming substantially to the undulating suction surface of the airfoil, said means being arranged to deliver an additional stream of fluid into and across the bottom of said valley tangentially to the curvature thereof and generally toward said trailing edge at a velocity greater than that of said stream of fluid flowing across the undulations, to thus create a reduced pressure in the valley for deflecting into said valley said stream of fluid flowing across the undulations, said means for delivering said additional stream of fluid consisting solely of a fluid passage extending through said airfoil substantially parallel to the direction of fluid flow relative to said airfoil, and formed with an enlarged mouth opening through said pressure surface and a restricted nozzle opening tangentially to said suction surface so as to direct said additional stream of fluid tangentially along said suction surface and into bottom of said valley, whereby a stream of high velocity fluid is supplied into said passage and through said nozzle.

References Cited by the Examiner

UNITED STATES PATENTS

| | | | |
|---|---|---|---|
| 1,879,594 | 9/1932 | Trey | 244—40 X |
| 2,649,265 | 8/1953 | Grant | 244—40 X |
| 2,899,150 | 8/1959 | Ellis | 244—130 X |

FOREIGN PATENTS

| | | |
|---|---|---|
| 993,177 | 10/1951 | France. |
| 327,052 | 3/1930 | Great Britain. |
| 56,072 | 4/1944 | Netherlands. |

MILTON BUCHLER, *Primary Examiner.*

B. BELKIN, *Assistant Examiner.*